(12) United States Patent
Chen et al.

(10) Patent No.: US 10,331,734 B2
(45) Date of Patent: Jun. 25, 2019

(54) METHOD AND APPARATUS FOR RECOMMENDING NETWORK SERVICE

(71) Applicant: TENCENT TECHNOLOGY (SHENZHEN) COMPANY LIMITED, Shenzhen (CN)

(72) Inventors: Rong Chen, Shenzhen (CN); Yong Wei, Shenzhen (CN); Xiaoping Lai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 354 days.

(21) Appl. No.: 15/194,670

(22) Filed: Jun. 28, 2016

(65) Prior Publication Data

US 2016/0306881 A1    Oct. 20, 2016

Related U.S. Application Data

(63) Continuation of application No. PCT/CN2015/079358, filed on May 20, 2015.

(30) Foreign Application Priority Data

May 20, 2014  (CN) .......................... 2014 1 0213492

(51) Int. Cl.
*G06F 17/30* (2006.01)
*G06F 16/635* (2019.01)
(Continued)

(52) U.S. Cl.
CPC .......... *G06F 16/637* (2019.01); *G06F 16/334* (2019.01); *G06F 16/955* (2019.01); *H04L 67/22* (2013.01); *H04L 67/306* (2013.01)

(58) Field of Classification Search
CPC ......... G06F 17/30766; G06F 17/30675; G06F 17/30876; G06F 16/637; G06F 16/334; G06F 16/955
(Continued)

(56) References Cited

U.S. PATENT DOCUMENTS

2010/0011020 A1    1/2010 Bouzid et al.

FOREIGN PATENT DOCUMENTS

CN    101206751 A      6/2008
CN    101420313    *   4/2009
(Continued)

OTHER PUBLICATIONS

Search Report in International Application No. PCT/CN2015/079358 dated Jul. 28, 2015, 2 pages.
(Continued)

*Primary Examiner* — Joshua Bullock
(74) *Attorney, Agent, or Firm* — Marshall, Gerstein & Borun LLP

(57) ABSTRACT

The present disclosure relates to network data analysis technology, and discloses a method and an apparatus for recommending a network service. The method includes: acquiring a historical browsing record of each user account on a network service; establishing a browsing sequence of each user account according to the historical browsing record corresponding to each user account; mapping the browsing sequence of each user account to a mapping value; aggregating all user accounts according to the mapping value corresponding to each user account, to obtain at least one user account group; and recommending the network service to each user account based on a user account group to which the user account belongs. The present disclosure
(Continued)

improves an accuracy rate of whether a recommended network service satisfies an interest of a user in the network service.

17 Claims, 6 Drawing Sheets

(51) Int. Cl.
    *G06F 16/33*     (2019.01)
    *G06F 16/955*     (2019.01)
    *H04L 29/08*     (2006.01)

(58) Field of Classification Search
    USPC .......................................................... 707/738
    See application file for complete search history.

(56) References Cited

FOREIGN PATENT DOCUMENTS

| CN | 101420313 A | | 4/2009 |
|----|-------------|---|--------|
| CN | 102637178 | * | 8/2012 |
| CN | 102637178 A | | 8/2012 |
| CN | 102646097 A | | 8/2012 |

OTHER PUBLICATIONS

International Preliminary Report on Patentability in International Application No. PCT/CN2015/079358 dated Nov. 22, 2016, 4 pages.

First Office Action for Chinese Patent Application No. 201410213492.2, dated May 18, 2017.

* cited by examiner

METHOD AND APPARATUS FOR RECOMMENDING NETWORK SERVICE

RELATED DOCUMENTS

This application is a continuation application of PCT/CN2015/079358 filed May 20, 2015 which claims the priority of Chinese Patent Application No. CN 2014 1021 3492.2, filed on May 20, 2014, the disclosures of all of which are hereby incorporated by reference.

FIELD OF THE TECHNOLOGY

The present disclosure relates to network data analysis technologies, and in particular, to a method and an apparatus for recommending a network service.

BACKGROUND OF THE DISCLOSURE

As the network age develops, network services have spread daily life of people. The network services include at least online video, online music, online reading, and online shopping. By using the online video as an example, on each video website, while a user is watching an online video, recommended videos of a same type are displayed at the same time below the currently watched video or in a hidden window. The recommended videos of the same type may be categorized according to parameters such as a category, a theme, or participating staff of the current video. For example, video categories include at least a movie, a TV series, a music video (MV), a micro film, and a video that is uploaded by a netizen; for another example, video themes include at least comedy, suspense, romance, and action; for still another example, participating staff of a video may include cast members such as a director and a scriptwriter in addition to all leading actors.

Currently, a video recommendation strategy includes association rules (AR) and collaborative filtering (CF). The AR and the CF both assume that an entire user group has a same movie-watching interest, and when a video is recommended to one user in the user group, top N videos of a same type, which are watched by the other users, are recommended to the user, where N>1 and N is an integer. For example, because it is assumed that an entire user group has a same movie-watching interest in action movies, when a video is recommended to a user A, top ten action movies that are watched by the other users are recommended to the user A.

In an actual operation process, there is a difference between subjective interests of users in a network service. Moreover, a network service recommended according to a standard of an interest of an entire user group in a corresponding network service may not satisfy an interest of a single user in the network service, thereby reducing an accuracy rate of whether a network service, recommended by a background system according to a standard of an interest of an entire user group in a corresponding network service, satisfies an interest of a user in the network service.

SUMMARY

To improve an accuracy rate of whether a recommended network service satisfies an interest of a user in the network service, embodiments of the present invention provide a method and an apparatus for recommending a network service. The technical solutions are as follows:

According to a first aspect of the present disclosure, a method for recommending a network service is provided. The method includes:

acquiring a historical browsing record of each user account on a network service;

establishing a browsing sequence of each user account according to the historical browsing record corresponding to each user account;

mapping the browsing sequence of each user account to a mapping value;

aggregating all user accounts according to the mapping value corresponding to each user account, to obtain at least one user account group; and recommending the network service to each user account based on a user account group to which the user account belongs.

According to a second aspect of the present disclosure, an apparatus for recommending a network service is provided. The apparatus includes:

an acquiring module, configured to acquire a historical browsing record of each user account on a network service;

a sequence establishment module, configured to establish a browsing sequence of each user account according to the historical browsing record that is corresponding to each user account and acquired by the acquiring module;

a mapping module, configured to map the browsing sequence, established by the sequence establishment module, of each user account to a mapping value;

an aggregation module, configured to aggregate all user accounts according to the mapping value that is corresponding to each user account and acquired by mapping by the mapping module, to obtain at least one user account group; and a recommendation module, configured to recommend the network service to each user account based on a user account group to which the user account belongs.

A historical browsing record of each user account on a network service is acquired, a browsing sequence of each user account is established according to the historical browsing record corresponding to each user account, the browsing sequence of each user account is mapped to a mapping value, all user accounts are aggregated according to the mapping value corresponding to each user account, to obtain at least one user account group, and then, the network service is recommended to each user account based on a user account group to which the user account belongs, which solves a problem that during recommendation of a network service to each user account, when the network service is recommended to one user account according to an interest of an entire user account group, a corresponding network service cannot be accurately recommended according to an actual interest of a user, thereby achieving an effect of improving an accuracy rate of whether the recommended network service satisfies an interest of a user in the network service.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the technical solutions and advantages of the present disclosure clearer, the following further describes the implementation manners of the present disclosure in detail with reference to the accompanying drawings.

In a method for recommending a network service provided by embodiments of the present invention, network services include at least online video, online music, online reading, and online shopping. A video of the online video may be a movie, a TV series, an MV, a micro film, or a video that is uploaded by a netizen; and online reading includes at least browsing news and online novel reading.

Figure 1:
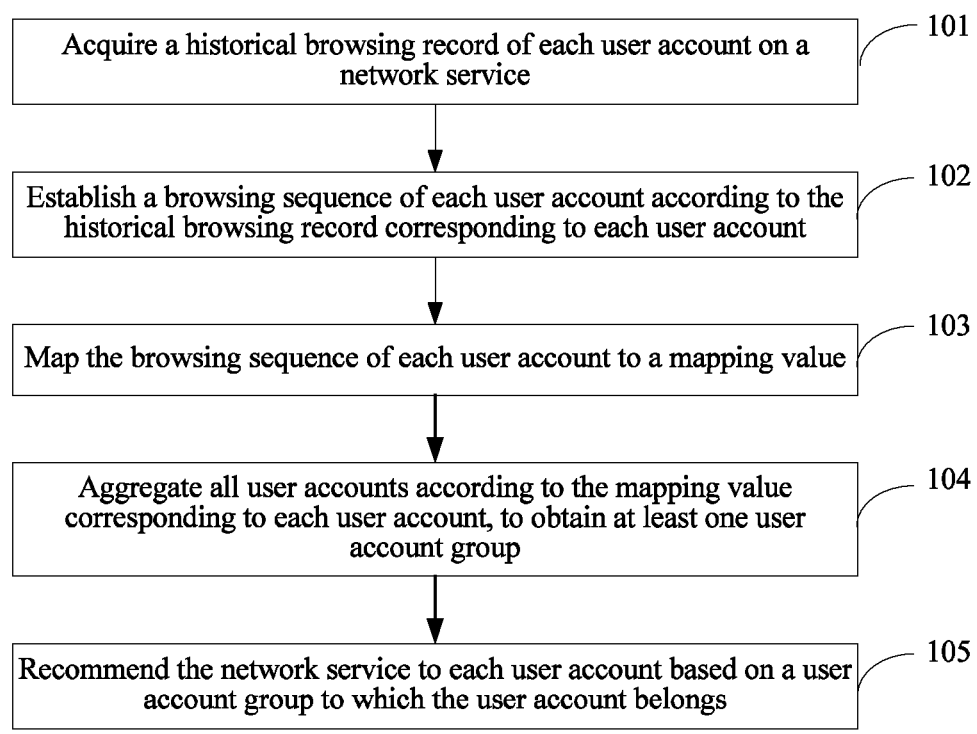
FIG. 1 is a method flow chart of a method for recommending a network service according to an embodiment of the present invention.

Referring to FIG. 1, FIG. 1 shows a method flowchart of a method for recommending a network service according to an embodiment of the present invention. The method for recommending a network service includes:

Step 101: Acquire a historical browsing record of each user account on a network service.

Herein, online video watching is used as an example of the network service. The historical browsing record may be a record of an online video watched by a user A within a preset time, where the preset time may be one week, one month, half a year, or one year; and the record of the watched online video includes a video type, a video name, and the number of times the online video is watched, where the video type includes at least a movie, a TV series, an MV, a micro film, or a video that is uploaded by a netizen.

Step 102: Establish a browsing sequence of each user account according to the historical browsing record corresponding to each user account.

Step 103: Map the browsing sequence of each user account to a mapping value.

Step 104: Aggregate all user accounts according to the mapping value corresponding to each user account, to obtain at least one user account group.

Step 105: Recommend the network service to each user account based on a user account group to which the user account belongs.

In conclusion, in the method for recommending a network service provided by this embodiment, a historical browsing record of each user account on a network service is acquired, a browsing sequence of each user account is established according to the historical browsing record corresponding to each user account, the browsing sequence of each user account is mapped to a mapping value, all user accounts are aggregated according to the mapping value corresponding to each user account, to obtain at least one user account group, and then, the network service is recommended to each user account based on a user account group to which the user account belongs, which solves a problem that during recommendation of a network service to each user account, when the network service is recommended to one user account according to an interest of an entire user account group, a corresponding network service cannot be accurately recommended according to an actual interest of a user, thereby achieving an effect of improving an accuracy rate of whether the recommended network service satisfies an interest of a user in the network service.

Figure 2:
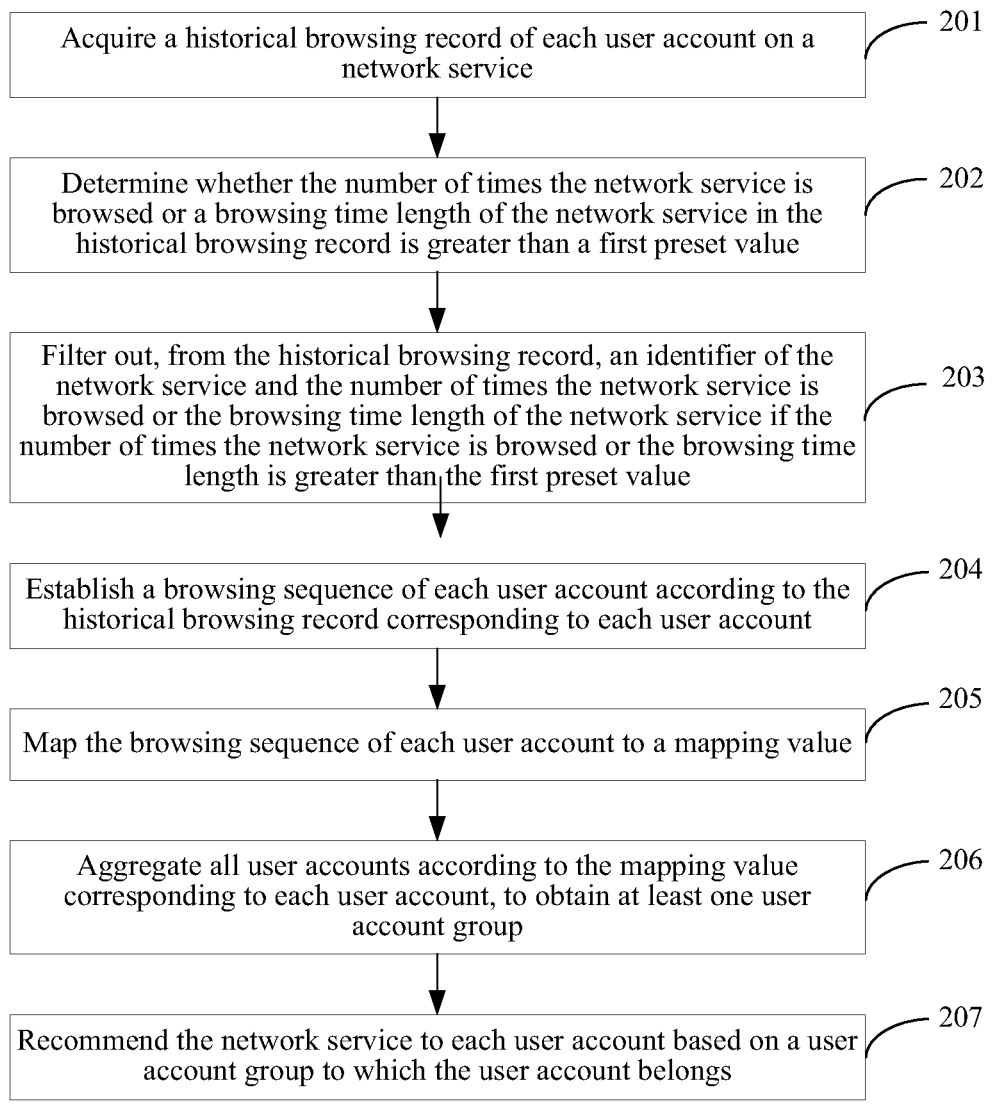
FIG. 2 is a method flow chart of a method for recommending a network service according to another embodiment of the present invention.

Referring to FIG. 2, FIG. 2 shows a method flowchart of a method for recommending a network service according to another embodiment of the present invention. As a more preferred embodiment provided based on the embodiment shown in FIG. 1, this embodiment describes in detail a specific implementation manner of recommending a network service to each user account based on a user account group to which the user account belongs. The method for recommending a network service includes:

Step 201: Acquire a historical browsing record of each user account on a network service.

Herein, an online video is used as an example of the network service. The historical browsing record, which is acquired by a server, of each user account on the network service is a record of an online video watched by a user i within a preset time, where the preset time includes at least one week, one month, half a year, or one year; and the record of the online video includes a video type, a video name, and the number of times the online video is watched.

Step 202: Determine whether the number of times the network service is browsed or a browsing time length of the network service in the historical browsing record is greater than a first preset value.

The first preset value may be set to the maximum number of times a same movie is browsed within 24 hours or one week, and it is assumed that the maximum number of times the user i browses a same movie every day is set to 3.

Step 203: Filter out, from the historical browsing record, an identifier of the network service and the number of times the network service is browsed or the browsing time length of the network service if the number of times the network service is browsed or the browsing time length is greater than the first preset value.

It is assumed that, a user c watches a movie A at least ten times within 24 hours, and if a time length of the movie A is two hours (120 minutes), the user c spends at least 20 hours in watching the movie ten times within 24 hours, this is, browses the movie A more than 3 times; therefore, the server determines that the number of times of the user c browses the movie is abnormal data and filters out a result that "the user c browses the movie A at least 10 times".

Step 204: Establish a browsing sequence of each user account according to the historical browsing record corresponding to each user account.

Herein, according to the historical browsing record obtained in step 201 to step 203, a browsing sequence $A=\{user_i: video_1, w_{i1}, video_2, w_{i2} \ldots video_n, w_{in}\}$ of the user i may be obtained, which indicates a browsing sequence established according to a historical browsing record corresponding to the user i. The sequence A indicates that, videos watched by the user i are $video_1$ to $video_n$ and weights corresponding to $video_1$ to $video_n$ are $w_{i1}$ to $w_{in}$, and i indicates that weights $w_{i1}$ to $w_{in}$ are weights in a browsing sequence that is formed according to videos watched by the user i.

The establishing, by the server, a browsing sequence of each user account according to the historical browsing record corresponding to each user account includes the followings steps:

a. The server extracts, for the historical browsing record corresponding to each user account, identifiers of network services of a same category and the number of times each network service is browsed or a browsing time length of the network service from the historical browsing record.

Online video watching is used as an example of the network service in this embodiment of the present invention. Among videos watched online, a movie is used as an example for illustration. Herein, extraction is performed on the historical browsing record of the user i, and a name of a movie watched by the user i and the number of times the movie is browsed are extracted; or a time length of browsing the movie by the user i is extracted.

b. The server generates a corresponding weight of the network service according to the number of times the network service is browsed or the browsing time length.

If a movie watched by the user i is a movie A and the number of times the movie is browsed is 3, a weight of the movie A may be set to 3;

or if a browsing time length of watching the movie A by the user i is 20 minutes, a weight of the movie A is set to 20.

In this embodiment of the present invention, description is made by using an example in which a weight of a moves is generated according to the number of times the movie is browsed. In addition, besides the number of times the movie is browsed, in the present disclosure, a weight of the movie may also be generated according to a browsing time length, which is not specifically limited.

c. The server combines the identifier of the network service and the corresponding weight of the network service into a network service 2-tuple.

Herein, the network service 2-tuple may include a name of a video and a weight corresponding to the video, that is, may be expressed as {movie A, 3}, where movie A is the name of the video and 3 is the weight corresponding to the movie A.

The combining, by the server, the identifier of the network service and the corresponding weight of the network service into a network service 2-tuple includes:

(1) detecting, by the server, whether the network service is a pre-acquired network service in a popular recommendation list;

(2) reducing, by the server, a weight corresponding to the network service according to a second preset value if it is detected that the network service is the pre-acquired network service in the popular recommendation list; and (3) combining, by the server, an identifier of the network service and the reduced weight into the network service 2-tuple.

For example, it is assumed that, when browsing an online video, if the user i browses the latest and hottest movie, because there is a popular recommendation list including the latest and hottest movies, the user is guided to watch a movie, which cannot reflect that an interest of the user i lies in the latest and hottest movie. Therefore, it is required to adjust a weight corresponding to the movie when it is learned that the user i browses a movie in the popular recommendation list. The second preset value in the step (2) may be set to 50%. When the user i watches a movie in the popular recommendation list, a weight that is generated according to the number of times the movie is browsed is cut by half. That is, assuming that the user i watches CAPTAIN AMERICA 2 in the popular recommendation list three times, before a weight is reduced, a weight corresponding to CAPTAIN AMERICA 2 is set to 3, and because CAPTAIN AMERICA 2 is a movie in the popular recommendation list, a corresponding weight is cut by half and the weight of CAPTAIN AMERICA 2 is reduced to 1.5.

The weight adjustment in step (1) to step (3) is performed because a movie-watching interest of a user is guided if there is a popular movie in the acquired popular recommendation list, and the movie-watching of the user cannot be reflected accurately. To provide an objective recommendation, a weight of the movie is adjusted after it is learned that a user watches a popular movie.

d. The server arranges all network service 2-tuples in a preset order and then obtains a browsing sequence of the user account.

Herein, the network service 2-tuples obtained in the foregoing step c are arranged, to obtain a sequence $A=\{user_i: video_1, w_{i1}, video_2, w_{i2} \ldots video_n, w_{in}\}$.

Specifically, assuming that there is a user i, if the user i watches CAPTAIN AMERICA twice, MARVEL'S THE AVENGERS three times, HULK twice, THOR once, and IRON MAN four times, a weight of CAPTAIN AMERICA, a weight of MARVEL'S THE AVENGERS, a weight of HULK, a weight of THOR, a weight of IRON MAN are set to 2, 3, 2, 1, and 4 respectively. A finally obtained browsing sequence of the user i is {$user_i$, CAPTAIN AMERICA, 2, MARVEL'S THE AVENGERS, 3, HULK, 2, THOR, 1, IRON MAN, 4}.

Herein, the browsing sequence of the user account may not be arranged in an ascending order or a descending order of the weights. Because hash codes corresponding to movie names are different in subsequent steps, the order in the browsing sequence of the user account does not affect a result of an f-bit hash value. Therefore, in the present disclosure, when the method for recommending a network service is implemented, the browsing sequence of the user account may not be arranged in an ascending order or a descending order of the weights.

Step 205: Map the browsing sequence of each user account to a mapping value.

The mapping, by the server, the browsing sequence of each user account to a mapping value includes:

performing, by the server, a simhash calculation on the browsing sequence of each user account, to obtain an f-bit hash value corresponding to each browsing sequence, where f≥3.

Figure 3A:
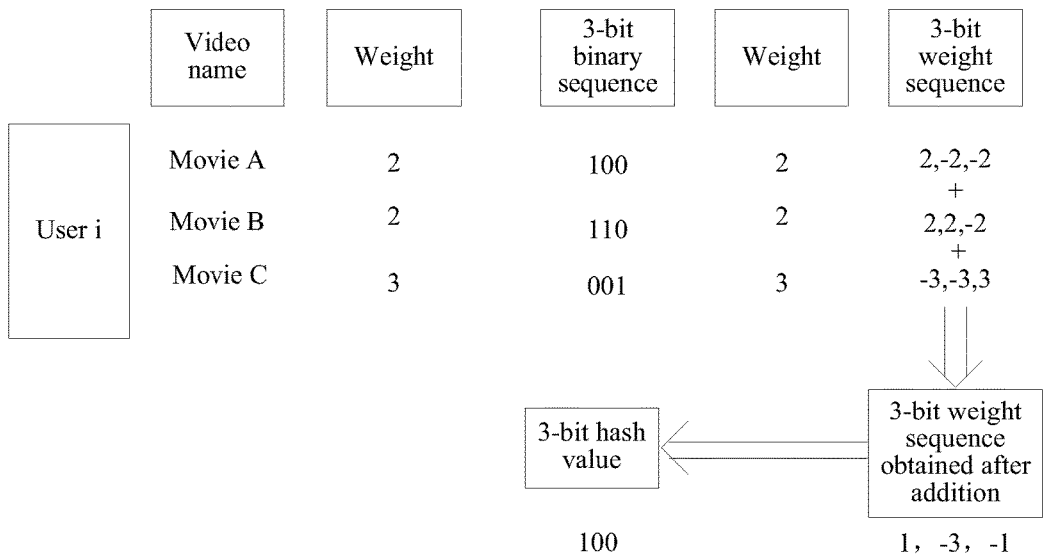
FIG. 3a is a flow chart of an operation of a simhash algorithm if f is set to 3 according to another embodiment of the present invention.

Refer to FIG. 3 for the process in which the server performs a simhash calculation on a browsing sequence of each user account, to obtain an f-bit hash value corresponding to each browsing sequence. FIG. 3 shows a process of obtaining a 3-bit hash value by means of a simhash calculation when f=3, including the following steps:

a. The server performs, for each network service 2-tuple in each browsing sequence, a simhash operation on an identifier of the network service in a network service 2-tuple, to obtain an f-bit binary sequence corresponding to the identifier.

Assuming that a browsing sequence corresponding to the user i is {$user_i$, movie A, 2, movie B, 2, movie C, 3}, a 3-bit binary sequence obtained by performing a hash operation on the corresponding movie A is 100, a 3-bit binary sequence obtained by performing a hash operation on the movie B is 110, and a 3-bit binary sequence obtained by performing a hash operation on the movie C is 001.

b. The server assigns a value to the f-bit binary sequence by using a weight in the network service 2-tuple, to obtain an f-bit weight sequence.

For the $i^{th}$ bit in the f-bit binary sequence, where i≥1, if the $i^{th}$ bit is 1, a positive weight value is assigned to the $i^{th}$ bit in the f-bit weight sequence; or if the $i^{th}$ bit is 0, a negative weight value is assigned to the $i^{th}$ bit in the f-bit weight sequence.

As assumed in a, a value is assigned to the binary sequence of the movie A in a by using the weight, to obtain a weight sequence {2, −2, −2}; a value is assigned to the binary sequence of the movie B in a by using the weight, to obtain a weight sequence {2, 2, −2}; and a value is assigned to the binary sequence of the movie C in a by using the weight, to obtain a weight sequence {−3, −3, 3}.

c. The server adds values in corresponding bits in the f-bit weight sequences of the network service 2-tuples in a same browsing sequence, to obtain an f-bit weight sequence of the browsing sequence.

Further, as described in b, the weight sequences corresponding to the movie A, movie B, and movie C are added to obtain a weight sequence {1, −3, −1} of the browsing sequence.

d. The server converts the f-bit weight sequence of the browsing sequence into an f-bit binary sequence according to a preset threshold and uses the binary sequence as an f-bit harsh value of the browsing sequence.

For the $i^{th}$ bit in the f-bit weight sequence, it is determined whether a value corresponding to the $i^{th}$ bit is greater than the preset threshold, where i≥1; and if the value in the $i^{th}$ bit is greater than the preset threshold, the value in the $i^{th}$ bit in the f-bit binary sequence is set to 1; or if the value in the $i^{th}$ bit is less than the preset threshold, the value in the $i^{th}$ bit in the f-bit binary sequence is set to 0.

Further, assuming that a value in the $i^{th}$ bit is greater than 0, the value in the $i^{th}$ bit in the 3-bit binary sequence is set to 1; and if a value in the $i^{th}$ bit is less than 0, the value in the $i^{th}$ bit in the 3-bit binary sequence is set to 0. It is obtained that an f-bit hash value of the browsing sequence of the user i is "100" by determining according to the weight sequence {1, −3, −1}, obtained in c, of the browsing sequence.

Figure 3B:
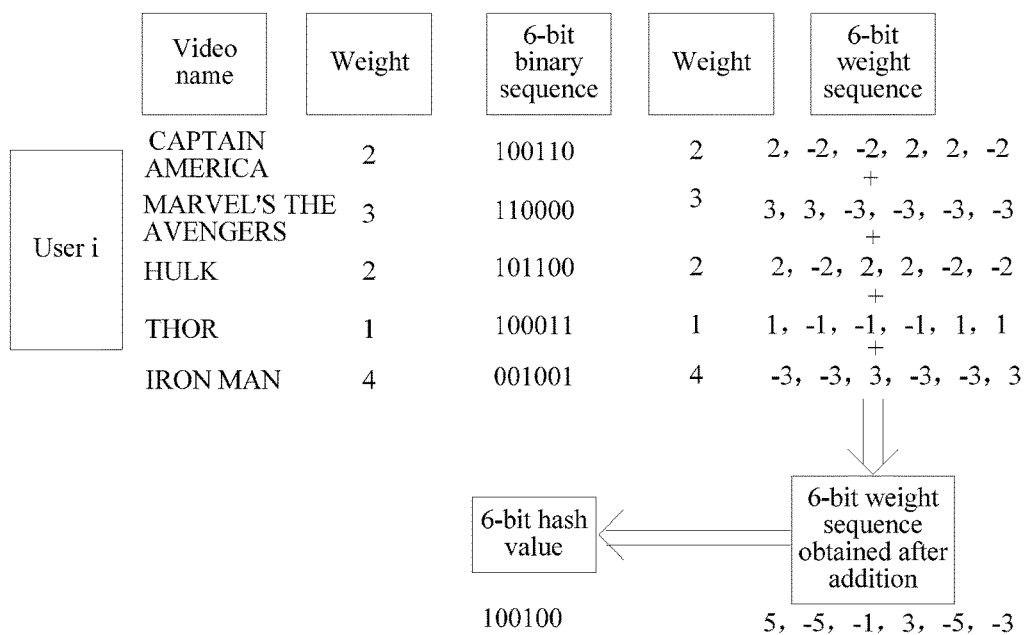
FIG. 3b is a flow chart of an operation of a simhash algorithm if f is set to 6 according to another embodiment of the present invention.

For example, referring to FIG. 3b, FIG. 3b shows a process of obtaining a 6-bit hash value by means of a simhash operation when f=6. If f is equal to 6, for the browsing sequence, obtained in d of step 204, of the use i, the following may be obtained by performing a simhash operation on the sequence:

(1) The browsing sequence of the user i is {user$_i$, CAPTAIN AMERICA, 2, MARVEL'S THE AVENGERS, 3, HULK, 2, THOR, 1, IRON MAN, 4}; and the following is obtained by performing a simhash operation on the following movies:

a 6-bit binary sequence "100110" is obtained by performing a simhash operation on CAPTAIN AMERICA;

a 6-bit binary sequence "110000" is obtained by performing a simhash operation on MARVEL'S THE AVENGERS;

a 6-bit binary sequence "101100" is obtained by performing a simhash operation on HULK;

a 6-bit binary sequence "100011" is obtained by performing a simhash operation on THOR; and a 6-bit binary sequence "001001" is obtained by performing a simhash operation on IRON MAN.

(2) Values are assigned to the 6-bit binary sequences obtained in (1) by using weights, to obtain weight sequences after the value assignment:

{user$_i$, CAPTAIN AMERICA {2, −2, −2, 2, 2, −2}, MARVEL'S THE AVENGERS {3, 3, −3, −3, −3, −3}, HULK {2, −2, 2, 2, −2, −2}, THOR {1, −1, −1, −1, 1, 1}, IRON MAN {−3, −3, 3, −3, −3, 3}}.

(3) A weight sequence {user$_i$, {5, −5, −1, 3, −5, −3}} is obtained by adding corresponding values in the weight sequences obtained in (2).

(4) The 6-bit weight sequence in (3) is converted into a 6-bit binary sequence.

The weight sequence in (3) is determined according to a rule that "if the value in the $i^{th}$ bit is greater than the preset threshold, the value in the $i^{th}$ bit in the f-bit binary sequence is set to 1; or if the value in the $i^{th}$ bit is less than the preset threshold, the value in the $i^{th}$ bit in the f-bit binary sequence is set to 0". Assuming that the preset threshold is 0, the first bit 5>0, and then the first bit in a corresponding binary sequence is 1; the second bit −5<0, and then the second bit in the corresponding binary sequence is 0; the third bit −1<0, and then the third bit in the corresponding binary sequence is 0; the fourth bit 3>0, and then the fourth bit in the corresponding binary sequence is 1; the fifth bit −5<0, and then the fifth bit in the corresponding binary sequence is 0; and the sixth bit −3<0, and then the sixth bit in the corresponding binary sequence is 0.

Therefore, a 6-bit hash value "100100" of the browsing sequence is obtained.

Step 206: Aggregate all user accounts according to the mapping value corresponding to each user account, to obtain at least one user account group.

The aggregating, by the server, all user accounts according to the mapping value corresponding to each user account, to obtain at least one user account group includes:

aggregating, by the server, user accounts corresponding to browsing sequences having a same f-bit hash value to a same user account group.

Assuming that besides the user i whose 6-bit hash value is "100100", a user c and a user b also have 6-bit hash values of "100100", the user i, the user c, and the user b are grouped into a same user account group 1.

Step 207: Recommend the network service to each user account based on a user account group to which the user account belongs.

The recommending, by the server, the network service to each user account based on a user account group to which the user account belongs includes the following steps:

a. The server queries a user account group to which the user account belongs.

Assuming that a movie is recommended to the user i, a user account group in which a corresponding 6-bit hash value is located is queried when the user i is watching the movie, to obtain that the user i belongs to a user account group 1.

b. The server recommends, according to the historical browsing record of each user account in the user account group and based on AR or CF, a corresponding network service to the user account.

Because the user account group 1 in which the user i is located is a movie-watching group composed of a majority of science fiction movies, a related science fiction movie may be recommended to the user i, for example, CAPTAIN AMERICA 2, IRON MAN 2, or THOR 2.

Herein, if the number of user accounts in a user account group is imbalanced, the number of groups and the number of users in each group may be adjusted according to f. The number C of the groups and the number of user accounts in each group are adjusted according to $C=2^f$. When the number of user accounts in a user account group is imbalanced, assuming that C is $2^6=64$ in this imbalanced situation, the number of user account groups can be reduced by reducing a value of f, to balance the number of the user account groups and the number of the user accounts in each user account group; and if f is set to 3, C is $2^3=8$. Due to a change of the value of f, step 302 to step 304 also change as the value of f changes.

Similarly, when a user is watching a TV series, according to the method for recommending a network service provided by this embodiment of the present invention, a TV series interesting the user can also be provided for the user, and the details are not described herein again.

When a user is shopping online, according to a commodity browsing record, the number of times multiple commodities are browsed may be acquired, a weight corresponding to each browsed commodity is further obtained, an f-bit hash value is obtained by using a simhash algorithm, and the users are then grouped, to obtain a result same as that in the video recommendation situation provided by this embodiment of the present invention. A same result may also be obtained for online reading, and the details are not described herein again.

In conclusion, in the method for recommending a network service provided by this embodiment, a historical browsing record of each user account on a network service is acquired, a browsing sequence of each user account is established according to the historical browsing record corresponding to each user account, the browsing sequence of each user account is mapped to a mapping value, all user accounts are aggregated according to the mapping value corresponding to each user account, to obtain at least one user account group, and then, the network service is recommended to each user account based on a user account group to which the user account belongs, which solves a problem that during recommendation of a network service to each user account, when the network service is recommended to one user account according to an interest of an entire user account group, a corresponding network service cannot be accurately recommended according to an actual interest of a user, thereby achieving an effect of improving an accuracy rate of whether the recommended network service satisfies an interest of a user in the network service. Moreover, adjusting the number of user account groups avoids waste of recommended resources caused by imbalance of the number of user accounts.

In a browsing sequence of a user account according to this embodiment of the present invention, online video watching is used as an example. Besides a movie type, the online video in the browsing sequence may further include a TV series, an MV, a micro film, and a video that is uploaded by a netizen. During a simhash operation, although calculation is performed based on only online videos of a same type, when the browsing sequence includes an online video of another type, the videos may be synchronously categorized for calculation. The details are subject to the method for recommending a network service provided by this embodiment of the present invention and are not described herein again.

Figure 4:
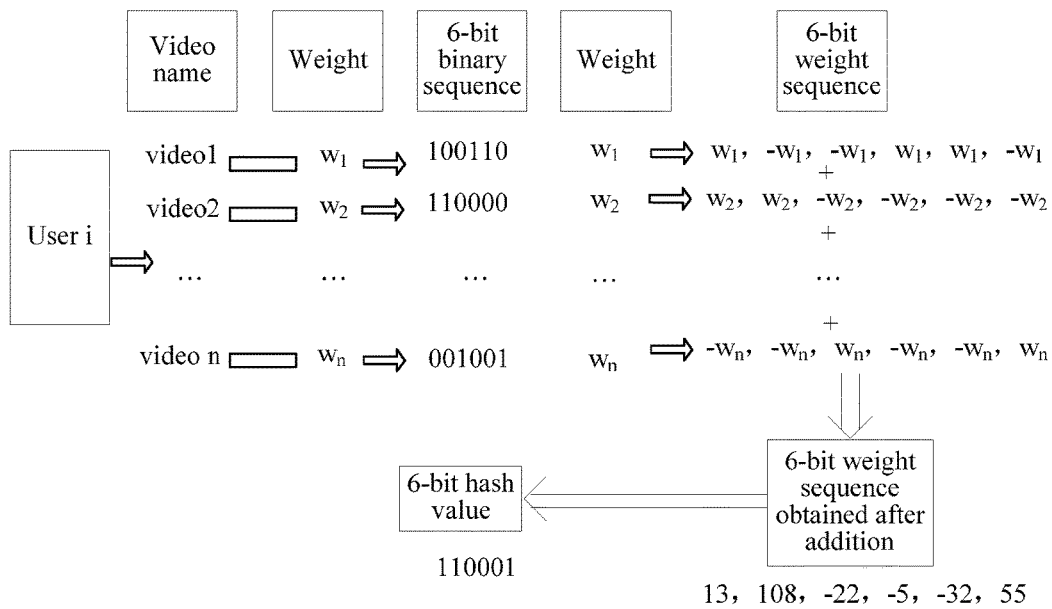
FIG. 4 is a flow chart of the principle of an f-bit simhash algorithm according to another embodiment of the present invention.

Referring to FIG. 4, FIG. 4 shows the operation principle of the simhash algorithm in the foregoing embodiment, which is as follows: (1) a group of f-dimensional vectors Vs are initialized to 0, and an f-bit binary numeral S is initialized to 0, where herein, as shown in FIG. 4, a 6-bit binary numeral S is provided; (2) according to a conventional hash algorithm, an f-bit weight sequence is generated for each video; in FIG. 4, a 6-bit weight sequence is generated for each video, where i equals from 1 to 6 in the 6-bit weight sequence, and if a value in the $i^{th}$ bit is 1, a weight of the video is added to a binary numeral in the $i^{th}$ bit of a vector V; otherwise, a corresponding weight is subtracted from a value in the $i^{th}$ bit of a video; and (3) values in corresponding bits in the 6-bit weight sequences of all the videos are added, to obtain an fit-bit weight sequence after the addition (13, 108, −22, −5, −32, 55); and it is obtained by using the fit-bit weight sequence after the addition that, if the $i^{th}$ bit in the fit-bit weight sequence after the addition corresponding to the videos is greater than 0, a binary numeral in a corresponding bit is 1; otherwise, a binary numeral in a corresponding bit is 0. Therefore, a 6-bit hash value of 110001 is output and obtained.

Figure 5:
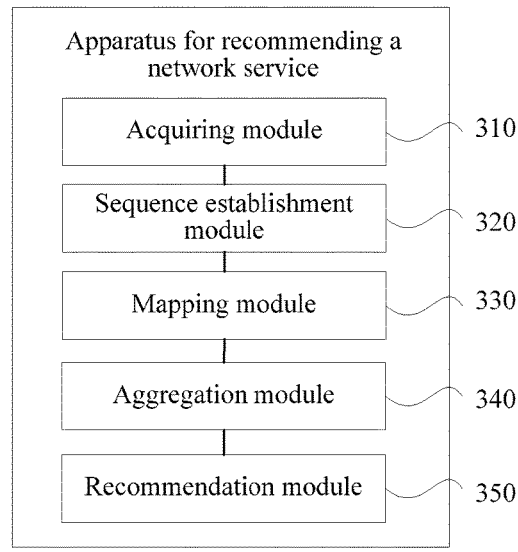
FIG. 5 is a structural block diagram of an apparatus for recommending a network service according to an embodiment of the present invention.

Referring to FIG. 5, FIG. 5 shows a structural block diagram of an apparatus for recommending a network service according to an embodiment of the present invention. The apparatus for recommending a network service includes an acquiring module 310, a sequence establishment module 320, a mapping module 330, an aggregation module 340, and a recommendation module 350.

The acquiring module 310 is configured to acquire a historical browsing record of each user account on a network service.

The sequence establishment module 320 is configured to establish a browsing sequence of each user account according to the historical browsing record that is corresponding to each user account and acquired by the acquiring module 310.

The mapping module 330 is configured to map the browsing sequence, established by the sequence establishment module 320, of each user account to a mapping value.

The aggregation module 340 is configured to aggregate all user accounts according to the mapping value that is corresponding to each user account and acquired by mapping by the mapping module 330, to obtain at least one user account group.

The recommendation module 350 is configured to recommend the network service to each user account based on a user account group to which the user account belongs.

In conclusion, for the apparatus for recommending a network service provided by this embodiment of the present invention, a historical browsing record of each user account on a network service is acquired, a browsing sequence of each user account is established according to the historical browsing record corresponding to each user account, the browsing sequence of each user account is mapped to a mapping value, all user accounts are aggregated according to the mapping value corresponding to each user account, to obtain at least one user account group, and then, the network service is recommended to each user account based on a user account group to which the user account belongs, which solves a problem that during recommendation of a network service to each user account, when the network service is recommended to one user account according to an interest of an entire user account group, a corresponding network service cannot be accurately recommended according to an actual interest of a user, thereby achieving an effect of improving an accuracy rate of whether the recommended network service satisfies an interest of a user in a network service.

Figure 6:
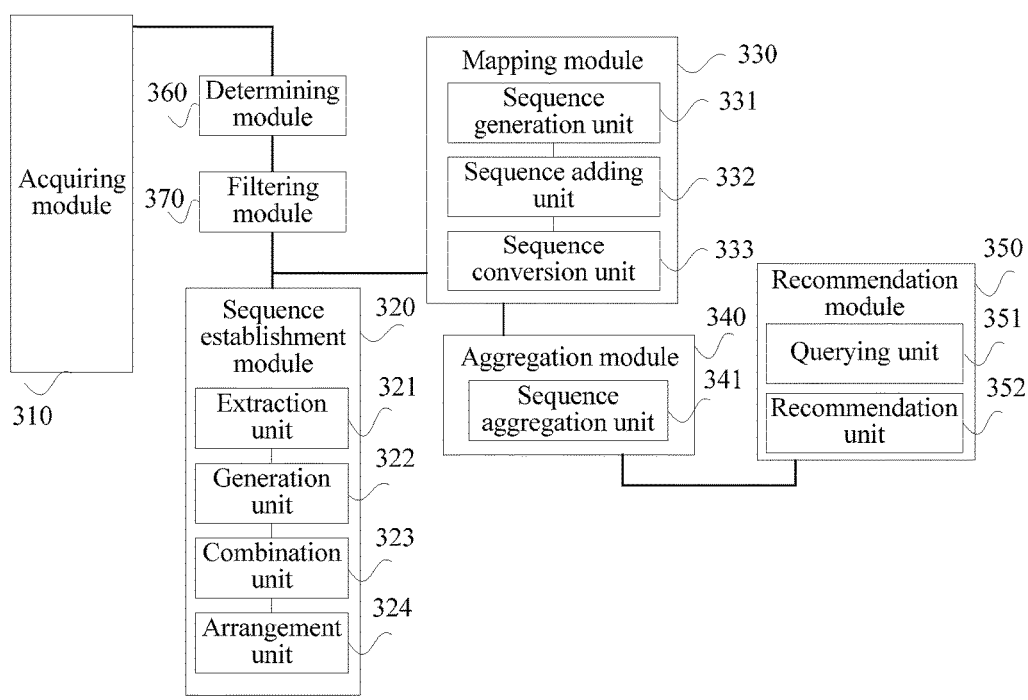
FIG. 6 is a structural block diagram of an apparatus for recommending a network service according to another embodiment of the present invention.

Referring to FIG. 6, FIG. 6 shows a structural block diagram of an apparatus for recommending a network service according to another embodiment of the present invention. The apparatus for recommending a network service includes an acquiring module 310, a sequence establishment module 320, a mapping module 330, an aggregation module 340, a recommendation module 350, a determining module 360, and a filtering module 370.

The acquiring module 310 is configured to acquire a historical browsing record of each user account on a network service.

The determining module 360 is configured to determine whether the number of times the network service is browsed a browsing time length of the network service in the historical browsing record is greater than a first preset value.

The filtering module 370 is configured to filter out, from the historical browsing record, an identifier of the network service and the number of times the network service is browsed or the browsing time length of the network service if the number of times the network service is browsed or the browsing time length is greater than the first preset value.

The sequence establishment module 320 is configured to establish a browsing sequence of each user account according to the historical browsing record that is corresponding to each user account and acquired by the acquiring module 310.

Optionally, the sequence establishment module 320 includes:

an extraction unit 321, configured to extract, for the historical browsing record corresponding to each user account, identifiers of network services of a same category and the number of times of each network service is browsed or a browsing time length of the network service from the historical browsing record;

a generation unit 322, configured to generate a corresponding weight of the network service according to the number of times the network service is browsed or the browsing time length that is extracted by the extraction unit 321;

a combination unit 323, configured to combine the identifier of the network service and the corresponding weight, generated by the generation unit 322, of the network service into a network service 2-tuple; and a arrangement unit 324, configured to arrange all network service 2-tuples combined by the combination unit 323 in a preset order and then obtain a browsing sequence of the user account.

Further, the combination unit 323 is configured to detect whether the network service is a pre-acquired network service in a popular recommendation list; reduce a weight corresponding to the network service according to a second preset value if it is detected that the network service is the pre-acquired network service in the popular recommendation list; and combine an identifier of the network service and the reduced weight into the network service 2-tuple.

The mapping module 330 is configured to map the browsing sequence, established by the sequence establishment module 320, of each user account to a mapping value.

Optionally, the mapping module 330 includes:

a sequence generation unit 331, configured to perform, for each network service 2-tuple in each browsing sequence, a hash operation on an identifier of the network service in the network service 2-tuple, to obtain an f-bit binary sequence corresponding to the identifier; and assign a value to the f-bit binary sequence by using a weight in the network service 2-tuple, to obtain an f-bit weight sequence;

a sequence adding unit 332, configured to add values in corresponding bits in the f-bit weight sequences of the network service 2-tuples in a same browsing sequence, to obtain an f-bit weight sequence of the browsing sequence; and a sequence conversion unit 333, configured to convert the f-bit weight sequence of the browsing sequence into an f-bit binary sequence according to a preset threshold and use the binary sequence as an f-bit harsh value of the browsing sequence.

Further, the sequence generation unit 331 is configured to: for the $i^{th}$ bit in the f-bit binary sequence, where $i≥1$, assign, if the $i^{th}$ bit is 1, a positive weight value to the $i^{th}$ bit in the f-bit weight sequence; or assign, if the $i^{th}$ bit is 0, a negative weight value to the $i^{th}$ bit in the f-bit weight sequence.

Further, the sequence conversion unit 333 is configured to determine, for the $i^{th}$ bit of the f-bit weight sequence, where $i≥1$, whether a value corresponding to the $i^{th}$ bit is greater than the preset threshold; and set the value in the $i^{th}$ bit in the f-bit binary sequence to 1 if the value in the $i^{th}$ bit is greater than the preset threshold; or set the value in the $i^{th}$ bit in the f-bit binary sequence to 0 if the value in the $i^{th}$ bit is less than the preset threshold.

The aggregation module 340 is configured to aggregate all user accounts according to the mapping value that is corresponding to each user account and acquired by mapping by the mapping module 330, to obtain at least one user account group.

Optionally, the aggregation module 340 includes:

a sequence aggregation unit 341, configured to aggregate user accounts corresponding to browsing sequences having a same f-bit hash value to a same user account group.

The recommendation module 350 is configured to recommend the network service to each user account based on a user account group to which the user account belongs.

Further, the recommendation module 350 includes:

a querying unit 351, configured to query a user account group to which the user account belongs; and a recommendation unit 352, configured to recommend, according to the historical browsing record of each user account in the user account group and based on AR or CF, a corresponding network service to the user account.

In conclusion, for the apparatus for recommending a network service provided by this embodiment, a historical browsing record of each user account on a network service is acquired, a browsing sequence of each user account is established according to the historical browsing record corresponding to each user account, the browsing sequence of each user account is mapped to a mapping value, all user accounts are aggregated according to the mapping value corresponding to each user account, to obtain at least one user account group, and then, the network service is recommended to each user account based on a user account group to which the user account belongs, which solves a problem that during recommendation of a network service to each user account, when the network service is recommended to one user account according to an interest of an entire user account group, a corresponding network service cannot be accurately recommended according to an actual interest of a user, thereby achieving an effect of improving an accuracy rate of whether the recommended network service satisfies an interest of a user in a network service. Moreover, adjusting the number of user account groups avoids waste of recommended resources caused by imbalance of the number of user accounts.

Figure 7:
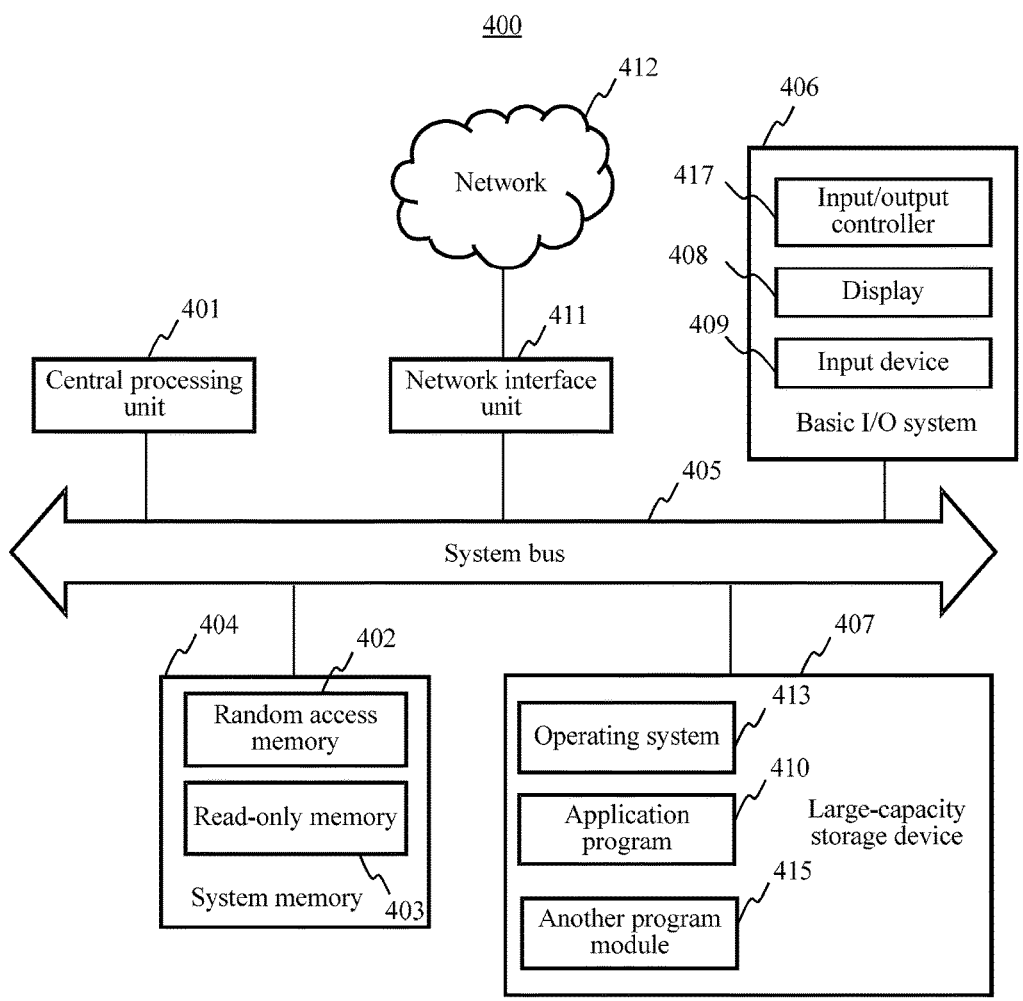
FIG. 7 is a schematic structural diagram of a server according to an embodiment of the present invention.

Referring to FIG. 7, FIG. 7 shows a schematic structural diagram of a server according to an embodiment of the present invention. The server 400 includes a central processing unit (CPU) 401, a system memory 404 including a random access memory (RAM) 402 and a read-only memory (ROM) 403, and a system bus 405 connecting the system memory 404 and the CPU 401. The server 400 further includes a basic input/output system (I/O system) 406 for assisting in information transmission between components in a computer and a large-capacity storage device 407 for storing an operating system 413, an application program 410, and another program module 415.

The basic I/O system 406 includes a display 408 for displaying information and an input device 409, such as a mouse or a keyboard, used by a user to input information. The display 408 and the input device 409 are both connected to the CPU 401 by using the system bus 405. The basic I/O system 406 may further include an input/output controller 417, configured to receive and process inputs from multiple other devices such as a keyboard, a mouse, and an electronic touch pen. Similarly, the input/output controller 417 further provides outputs to a display screen, a printer, or an output device of another type.

The large-capacity storage device 407 is connected to the CPU 401 by using a large-capacity storage controller (not shown) connected to the system bus 405. The large-capacity storage device 407 and a computer readable medium related thereto provide the server 400 with non-volatile storage. In other words, the large-capacity storage device 407 may include a computer readable medium (not shown) such as a hard disk, or a CD-ROM drive.

Generally, the computer readable medium may include a computer storage medium and a communications medium. The computer storage medium includes volatile and non-volatile, and removable and non-removable media that are implemented by any method or technology and used for storing information such as a computer readable instruction, a data structure, a program module, or other data. The computer storage medium includes an RAM, an ROM, an EPROM, an EEPROM, a flash memory, or another solid-state storage technology, a CD-ROM, a DVD or other optical storage, a cassette, a magnetic tape, a disk storage or other magnetic storage devices. Certainly, a person skilled in the art may know that the computer storage medium is not limited to the above types. The foregoing system memory 404 and the large-capacity storage device 407 may be collectively referred to as a memory.

According to the embodiments of the present invention, the server 400 may further be connected to a remote computer on a network through a network such as the Internet. That is, the server 400 may be connected to a network 412 by using a network interface unit 411 that is connected to the system bus 405, in other words, the server 400 may also use the network interface unit 411 to be connected to a network of another type or a remote computer system (which is not shown).

The memory further includes one or more programs, and the one or more programs are stored in the memory. The server is configured to perform, according to the program stored in the memory, the method for recommending a network service shown in FIG. 1 and FIG. 2.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for recommending a network service, comprising:
   acquiring a historical browsing record of each user account on a network service;
   establishing a browsing sequence of each user account according to the historical browsing record corresponding to each user account;
   mapping the browsing sequence of each user account to a mapping value;
   aggregating all user accounts according to the mapping value corresponding to each user account, to obtain at least one user account group; and
   recommending the network service to each user account based on a user account group to which the user account belongs;
   wherein mapping the browsing sequence of each user account to a mapping value comprises:
   performing, for each network service 2-tuple in each browsing sequence, a hash operation on an identifier of the network service in the network service 2-tuple, so as to obtain an f-bit binary sequence corresponding to the identifier; and assigning a value to the f-bit binary sequence by using a weight in the network service 2-tuple, to obtain an f-bit weight sequence;
   adding values in corresponding bits in the f-bit weight sequences of the network service 2-tuples in a same browsing sequence, to obtain an f-bit weight sequence of the browsing sequence; and
   converting the f-bit weight sequence of the browsing sequence into an f-bit binary sequence according to a preset threshold and using the binary sequence as an f-bit harsh value which serves as the mapping value of the browsing sequence.

2. The method according to claim 1, wherein the establishing a browsing sequence of each user account according to the historical browsing record corresponding to each user account comprises:
   extracting, for the historical browsing record corresponding to each user account, identifiers of network services of a same category and the number of times each network service is browsed or a browsing time length of the network service from the historical browsing record;
   generating a corresponding weight of the network service according to the number of times the network service is browsed or the browsing time length;
   combining the identifier of the network service and the corresponding weight of the network services into a network service 2-tuple; and
   arranging all network service 2-tuples in a preset order and obtaining a browsing sequence of the user account.

3. The method according to claim 2, wherein the combining the identifier of the network service and the corresponding weight of the network service into a network service 2-tuple comprises:
   detecting whether the network service is a pre-acquired network service in a popular recommendation list;
   reducing a weight corresponding to the network service according to a second preset value if it is detected that the network service is the pre-acquired network service in the popular recommendation list; and combining the identifier of the network service and the reduced weight into the network service 2-tuple.

4. The method according to claim 1, wherein the assigning a value to the f-bit binary sequence by using a weight in the network service 2-tuple, to obtain an f-bit weight sequence comprises:

for the $i^{th}$ bit in the f-bit binary sequence, wherein i≥1, if the $i^{th}$ bit is 1, assigning a positive weight value to the $i^{th}$ bit in the f-bit weight sequence; or if the $i^{th}$ bit is 0, assigning a negative weight value to the $i^{th}$ bit in the f-bit weight sequence.

5. The method according to claim 1, wherein the converting the f-bit weight sequence of the browsing sequence into an f-bit binary sequence according to a preset threshold comprises:

determining, for the $i^{th}$ bit of the f-bit weight sequence, whether a value corresponding to the $i^{th}$ bit is greater than the preset threshold, wherein i≥1; and setting the value in the $i^{th}$ bit in the f-bit binary sequence to 1 if the value in the $i^{th}$ bit is greater than the preset threshold; or setting the value in the $i^{th}$ bit in the f-bit binary sequence to 0 if the value in the $i^{th}$ bit is less than the preset threshold.

6. The method according to claim 1, before the establishing a browsing sequence of each user account according to the historical browsing record corresponding to each user account, further comprising:

determining whether the number of times the network service is browsed or a browsing time length of the network service in the historical browsing record is greater than a first preset value; and filtering out, from the historical browsing record, an identifier of the network service and the number of times the network service is browsed or the browsing time length of the network service if the number of times the network service is browsed or the browsing time length is greater than the first preset value.

7. The method according to claim 1, wherein the recommending the network service to each user account based on a user account group to which the user account belongs comprises:

querying a user account group to which the user account belongs; and recommending, according to the historical browsing record of each user account in the user account group and based on Association Rules (AR) or Collaborative Filtering (CF), a corresponding network service to the user account.

8. An apparatus for recommending a network service, the apparatus comprising: a processor and a memory storing computer-readable instructions executable by the processor to:

acquire a historical browsing record of each user account on a network service;

establish a browsing sequence of each user account according to the historical browsing record that is corresponding to each user account and acquired by the acquiring module;

perform, for each network service 2-tuple in each browsing sequence, a hash operation on an identifier of the network service in the network service 2-tuple, to obtain an f-bit binary sequence corresponding to the identifier; and assign a value to the f-bit binary sequence by using a weight in the network service 2-tuple, to obtain an f-bit weight sequence;

add values in corresponding bits in the f-bit weight sequences of the network service 2-tuples in a same browsing sequence, to obtain an f-bit weight sequence of the browsing sequence;

convert the f-bit weight sequence of the browsing sequence into an f-bit binary sequence according to a preset threshold and use the binary sequence as an f-bit harsh value which serves as a mapping value of the browsing sequence;

aggregate all user accounts according to the mapping value that is corresponding to each user account, to obtain at least one user account group; and recommend the network service to each user account based on a user account group to which the user account belongs.

9. The apparatus according to claim 8, wherein the computer-readable instructions are executable by the processor to:

extract, for the historical browsing record corresponding to each user account, identifiers of network services of a same category and the number of times the network service is browsed or a browsing time length of the network service from the historical browsing record;

generate a corresponding weight of the network service according to the number of times the network service is browsed or the browsing time length that is extracted by the extraction unit;

combine the identifier of the network service and the corresponding weight of the network service into a network service 2-tuple; and arrange all network service 2-tuples in a preset order and then obtain a browsing sequence of the user account.

10. The apparatus according to claim 9, wherein the computer-readable instructions are executable by the processor to: detect whether the network service is a pre-acquired network service in a popular recommendation list; reduce a weight corresponding to the network service according to a second preset value if it is detected that the network service is the pre-acquired network service in the popular recommendation list; and combine an identifier of the network service and the reduced weight into the network service 2-tuple.

11. The apparatus according to claim 9, wherein the computer-readable instructions are executable by the processor to:

query a user account group to which the user account belongs; and recommend, according to the historical browsing record of each user account in the user account group and based on AR or CF, a corresponding network service to the user account.

12. The apparatus according to claim 8, wherein the computer-readable instructions are executable by the processor to: for the $i^{th}$ bit in the f-bit binary sequence, wherein i≥1, assign, if the $i^{th}$ bit is 1, a positive weight value to the $i^{th}$ bit in the f-bit weight sequence; or assign, if the $i^{th}$ bit is 0, a negative weight value to the $i^{th}$ bit in the f-bit weight sequence.

13. The apparatus according to claim 8, wherein the computer-readable instructions are executable by the processor to: determine, for the $i^{th}$ bit of the f-bit weight sequence, whether a value corresponding to the $i^{th}$ bit is greater than the preset threshold, wherein i≥1; and set the value in the $i^{th}$ bit in the f-bit binary sequence to 1 if the value in the $i^{th}$ bit is greater than the preset threshold; or set the value in the $i^{th}$ bit in the f-bit binary sequence to 0 if the value in the $i^{th}$ bit is less than the preset threshold.

14. The apparatus according to claim 8, wherein the computer-readable instructions are executable by the processor to:
- determine, before the browsing sequence of each user account is established according to the historical browsing record corresponding to each user account, whether the number of times the network service is browsed or a browsing time length of the network service in the historical browsing record is greater than a first preset value; and
- filter out, from the historical browsing record, an identifier of the network service and the number of times the network service is browsed or the browsing time length of the network service if the number of times the network service is browsed or the browsing time length is greater than the first preset value.

15. A non-transitory computer-readable storage medium storing instructions capable of causing an electronic device, upon execution of the instructions by a controller of the electronic device, to perform actions of:
- acquiring a historical browsing record of each user account on a network service;
- establishing a browsing sequence of each user account according to the historical browsing record corresponding to each user account;
- mapping the browsing sequence of each user account to a mapping value;
- aggregating all user accounts according to the mapping value corresponding to each user account, to obtain at least one user account group; and
- recommending the network service to each user account based on a user account group to which the user account belongs;
- wherein the mapping the browsing sequence of each user account to a mapping value comprises:
- performing, for each network service 2-tuple in each browsing sequence, a hash operation on an identifier of the network service in the network service 2-tuple, so as to obtain an f-bit binary sequence corresponding to the identifier; and assigning a value to the f-bit binary sequence by using a weight in the network service 2-tuple, to obtain an f-bit weight sequence;
- adding values in corresponding bits in the f-bit weight sequences of the network service 2-tuples in a same browsing sequence, to obtain an f-bit weight sequence of the browsing sequence; and
- converting the f-bit weight sequence of the browsing sequence into an f-bit binary sequence according to a preset threshold and using the binary sequence as an f-bit harsh value which serves as the mapping value of the browsing sequence.

16. The storage medium according to claim 15, wherein the establishing a browsing sequence of each user account according to the historical browsing record corresponding to each user account comprises:
- extracting, for the historical browsing record corresponding to each user account, identifiers of network services of a same category and the number of times each network service is browsed or a browsing time length of the network service from the historical browsing record;
- generating a corresponding weight of the network service according to the number of times the network service is browsed or the browsing time length;
- combining the identifier of the network service and the corresponding weight of the network services into a network service 2-tuple; and
- arranging all network service 2-tuples in a preset order and obtaining a browsing sequence of the user account.

17. The storage medium according to claim 15, wherein the instructions are further capable of causing the electronic device to perform actions of: before the establishing a browsing sequence of each user account according to the historical browsing record corresponding to each user account,
- determining whether the number of times the network service is browsed or a browsing time length of the network service in the historical browsing record is greater than a first preset value; and
- filtering out, from the historical browsing record, an identifier of the network service and the number of times the network service is browsed or the browsing time length of the network service if the number of times the network service is browsed or the browsing time length is greater than the first preset value.

\* \* \* \* \*